Patented Sept. 14, 1926.

1,600,065

UNITED STATES PATENT OFFICE.

GEORG PLOCHMANN, OF TEPLITZ-SCHONAU, CZECHOSLOVAKIA.

PROCESS OF MAKING FUEL BRIQUETTES.

No Drawing. Application filed July 7, 1925, Serial No. 42,047, and in Czechoslovakia May 2, 1925.

The object of my invention is a process of making fuel briquettes which are resistant to the action of water or moisture, the invention being directed, more particularly, to making efficient briquettes of high calorific value with a comparatively very small proportion of binding agent.

The invention aims firstly at so treating the raw material, before it is actually moulded, that strong and waterproof briquettes can be made therefrom wholly or largely without addition of solid or liquid binding agents. As will be explained hereinafter, the preliminary treatment varies somewhat according to the moisture content and structure of the raw material.

With lignites of wood structure, where the cell fibres are not yet thoroughly carbonized, it has heretofore been found difficult to obtain waterproof briquettes. The moisture content of such lignites amounts often to from 40 to 55%, and the water is liable to be given off in air, causing crumbling of the material.

In modern processes of making briquettes, particularly where the older brown coals are used, strong preliminary drying is often applied, sometimes reducing the moisture content to 10% or even considerably less. My researches and tests have shown that with younger brown coals, closely approximately to the lignite type, such thorough preliminary drying is distinctly to be avoided when waterproof briquettes are required. The more moisture is taken from the cells of lignitic brown coal, the more energetic is the subsequent absorption of moisture by capillarity. Then the particles swell and the cohesion in the briquette is weakened or destroyed. This may even occur if the moisture content was reduced only to the long established figure of about 14 to 16%, unless special measures are taken. It is due to the fact that the still persisting cell structure is rendered capillary and hygroscopic by the drying process.

According to my invention, the appropriately regulated preliminary drying is followed by exposure of the material to gases or vapours of distillation, and then by pressing. For economy of heat, I arranged that the temperature to which the material is raised does not substantially exceed that at which the moulding and pressing can be effected. The gases issuing from the material may be made use of in the process.

In accordance with the considerations set forth with reference to lignitic material I extract from the raw material by the preliminary drying operation only so much of the water content as is necessary to render the material adequately permeable and absorbent for the subsequent treatment with gases and vapours, leaving, in the cells sufficient moisture to prevent excessive hygroscopic action, accompanied by swelling. Tests made with material of pronounced lignitic character, such as found in Germany and Bohemia, show that strong, waterproof briquettes can be made therefrom when the moisture content has been reduced, by preliminary drying, to about one-half, or somewhat less, of the moisture originally present. The carbonaceous particles, deprived only of the appropriate proportion of their water content, are then well permeated by the gas or vapour, and become charged or coated with the products of condensation due to the cooling thereof. A balanced condition, in regard to absorption and emission of moisture, may be said to be established in the briquette.

The general mode of procedure is as follows:—

The granular or powdered raw material, or raw material suitably broken up or divided for the purposes of the process, is subjected to the preliminary drying operation in open or closed apparatus of approved type, the moisture content being reduced to the degree indicated by the considerations set forth above.

The material is then treated in separate apparatus, such as a gas generator, retort, rotary oven or other closed appliance, wherein it is exposed to gases or vapours of distillation, which may be evolved from material of the same kind or from other carbonaceous raw material, solid or liquid, or from distillation products of such material, with a suitable bitumen content.

The gases or vapours are introduced, or passed through, by pressure or suction, in such a manner that they not only sweep over the briquettes material and coat it with condensation products, but are also able to penetrate the pores and deposit tarry products of condensation therein.

The material is then moulded and pressed.

As no particularly high temperature is required for the process I need not use high temperature retort gases (such as gases at from 600 to 1000° C.), but may use generator gas at a temperature so regulated that the gas will heat the material (cooled after the preliminary drying) only to the temperature required for moulding and pressing.

The gas or vapour introduced gives off condensable products, as stated, which act as binding agents, and combustible gases issue from the apparatus. These are used for purposes of the process, more particularly for the preliminary drying, but also if convenient for generating fresh gases and vapours of distillation. Thus the process is in part a cyclic process, which renders it highly economical.

What I claim is:—

1. The process of manufacturing fuel briquettes from lignitic brown coals which have retained a woody structure, consisting in subjecting the raw material to a preliminary drying operation which is so regulated in accordance with the structure and moisture content of the raw material that the moisture content is not reduced to a degree which renders the material actively hygroscopic, charging the cells and pores by treating the material with gases or vapours evolved by distillation of carbonaceous material having a suitable bitumen content, and finally pressing the material to form the briquettes.

2. The process of manufacturing fuel briquettes from lignitic brown coals which have retained a woody structure, consisting in dividing up the raw material and subjecting the raw material to a preliminary drying operation which is so regulated in accordance with the structure and moisture content of the raw material that the moisture content is not reduced to a degree which renders the material actively hygroscopic, charging the cells and pores by treating the material with gases or vapours evolved by distillation of carbonaceous material having a suitable bitumen content, and finally pressing the material to form the briquettes.

3. The process of manufacturing fuel briquettes from lignitic brown coals which have retained a woody structure, consisting in dividing up the raw material and subjecting the raw material to a preliminary drying operation which is so regulated in accordance with the structure and moisture content of the raw material that the moisture content is not reduced to a degree which renders the material actively hygroscopic, passing into and through the material gases or vapours evolved by distillation of carbonaceous material having a suitable bitumen content, and finally pressing the material to form the briquettes.

4. The process of manufacturing fuel briquettes from lignitic brown coals which have retained a woody structure, consisting in dividing up the raw material and subjecting the raw material to a preliminary drying operation which is so regulated in accordance with the structure and moisture content of the raw material that the moisture content is not reduced to a degree which renders the material actively hygroscopic, passing into and through the material gases or vapours evolved by distillation of lignitic brown coal, and then pressing the material to form briquettes.

5. The process of manufacturing fuel briquettes from lignitic brown coals which have retained a woody structure, consisting in dividing up the raw material and subjecting the raw material to a preliminary drying operation which is so regulated in accordance with the structure and moisture content of the raw material that the moisture content is not reduced to a degree which renders the material actively hygroscopic, passing into and through the material gases or vapours under pressure evolved by distillation of carbonaceous material having a suitable bitumen content, and finally pressing the material to form the briquettes.

6. The process of manufacturing fuel briquettes from lignitic brown coals which have retained a woody structure, consisting in subjecting the raw material to a preliminary drying operation which is so regulated in accordance with the structure and moisture content of the raw material that the material becomes capable of absorbing gas or vapour but that the moisture content is not reduced to a degree which renders the material actively hygroscopic, charging the cells and pores by treating the material with gases or vapours evolved by distillation of carbonaceous material, and having a suitable bitumen content, and finally pressing the material to form the briquettes.

7. The process of manufacturing fuel briquettes from lignitic brown coals which have retained a woody structure, consisting in dividing up the raw material and subjecting the raw material to a preliminary drying operation which is so regulated in accordance with the structure and moisture content of the raw material that the moisture content is not reduced to a degree which renders the material actively hygroscopic, passing into and through the material gases or vapours evolved by distillation of carbonaceous material having a suitable bitumen content, and, finally pressing the material to form the briquettes, the gases or vapours being introduced at approximately the temperature required to raise the material to the temperature required for pressing it.

8. The process of manufacturing fuel briquettes as specified in claim 1 comprising using the combustible gas or fuel previously passed through the material for the preliminary drying of fresh raw material.

9. The process of manufacturing fuel briquettes as specified in claim 2 comprising using the combustible gas or fuel previously passed through the material for the preliminary drying of fresh raw material.

10. The process of manufacturing fuel briquettes as specified in claim 3 comprising using the combustible gas or fuel previously passed through the material for the preliminary drying of fresh raw material.

11. The process of manufacturing fuel briquettes as specified in claim 4 and comprising using the combustible gas or fuel previously passed through the material for the preliminary drying of fresh raw material.

In testimony whereof I affix my signature.

GEORG PLOCHMANN.